United States Patent
Pan et al.

[11] Patent Number: 5,940,298
[45] Date of Patent: Aug. 17, 1999

[54] CAPACITY LOSS CONTROL METHOD FOR PREVENTATIVE MAINTENANCE IN IC PLANT

[75] Inventors: Yirn-Sheng Pan; Horng-Huei Tseng, both of Hsinchu; Chun-Yen Kuo; Jeng-Tyan Lin, both of Kaohsung, all of Taiwan

[73] Assignee: Vanguard International Semiconductor Corporation, Hsin-Chu, Taiwan

[21] Appl. No.: 08/852,976

[22] Filed: May 7, 1997

[51] Int. Cl.$^6$ .................................................. G06F 19/00
[52] U.S. Cl. ......................... 364/468.06; 705/7; 702/185
[58] Field of Search ........................ 364/468.06, 468.15; 705/7; 702/185

[56] References Cited

U.S. PATENT DOCUMENTS

| | | | |
|---|---|---|---|
| 5,325,304 | 6/1994 | Aoki | 364/468.06 |
| 5,446,671 | 8/1995 | Weaver et al. | 364/468.06 |
| 5,559,710 | 9/1996 | Shahrary et al. | 364/468.06 |
| 5,754,451 | 5/1998 | Williams | 702/185 |

*Primary Examiner*—William Grant
*Assistant Examiner*—Chad Rapp
*Attorney, Agent, or Firm*—George O. Saile; Stephen B. Ackerman; Graham S. Jones, II

[57] ABSTRACT

A process is provided for operating a manufacturing plant subsequent to preventative maintenance steps. The steps of the process are the following. Provide a data processing system having memory means for data storage. Provide central processing means for (a) accessing data from the memory means, (b) receiving data from data input means and (c) supplying data to the memory means. Provide Preventive Maintenance (PM) Duration (D) data to the data processing system. Calculate the effect of a PM schedule upon the efficiency of operation of the plant. Provide a new PM schedule to improve the efficiency of operation of the plant.

16 Claims, 3 Drawing Sheets

CAPACITY LOSS CONTROL METHOD FOR PREVENTATIVE MAINTENANCE IN IC PLANT

BACKGROUND OF THE INVENTION

1. Field of the Invention

This invention relates to manufacturing control systems for controlling plants manufacturing integrated circuits and more particularly, to systems for improving efficiency of use of tools for manufacturing of integrated circuit parts.

2. Description of Related Art

Workstation Preventative Maintenance (PM) is one of the most frequent activities in the manufacturing control system of an Integrated Circuit (IC) plant. In the past, the time schedules for PM was dominated by technical concerns, rather than by other factors which might be considered. No actions were taken either to evaluate the possible effect of a PM schedule upon the efficiency of operation of the IC plant. Neither were the production issues such as the linearity of the output and waste due to lose of potential manufacturing capacity considered, nor were strategies employed to avoid the impact of the PM schedule.

U.S. Pat. No. 5,446,671 of Weaver et al. for "Look-Ahead Method for Maintaining Optimum Queued Quantities of In-Process Parts at a Manufacturing Bottleneck" monitors potential manufacturing bottlenecks and sets maximum and minimum queue quantities for each product having a bottleneck associated therewith. The processing schedule of a particular lot which in ready to proceed to a bottleneck step is determined based upon an analysis as to whether its maximum and minimum queue limits comply with certain criteria. If not, then the lot has a set flag status associated therewith which delays processing until after all other lots which have a clear flag status have been processed.

U.S. Pat. No. 5,325,304 of Aoki for "Production Instructing Apparatus for Feeding Required Quantities of Materials to Meet an Appointed Delivery Date" shows a system which has a file for storing the state of every product being manufactured and every stock product and a file for storing the production capacity of each producing apparatus for adjusting the feeding of materials to meet delivery dates. Priority lots are given priority in scheduling.

SUMMARY OF THE INVENTION

An object of this invention is to develop a systematic system for evaluation of the impact of PM and to provide procedures for avoiding the undesired impact of the PM schedule.

This invention employs a process for representing the relationship among capacity loss (waste of potential capacity), WIP (Work In Process) distribution, PM duration and capacity deviation in the PM step. With this formula, a closed loop system is implemented to provide actions for adjusting production to prevent an undesired lose (waste) of capacity caused by the PM step.

In accordance with this invention a method is provided for operating a manufacturing plant subsequent to preventative maintenance steps. The following steps are employed in the process. Provide a data processing system having memory means for data storage. Then provide central processing means for (a) accessing data from the memory means, (b) receiving data from data input means and (c) supplying data to the memory means. Also, provide Preventive Maintenance (PM) Duration (D) data to the data processing system. Calculate the effect of a PM schedule upon the efficiency of operation of the plant. Provide a new PM schedule to improve the efficiency of operation of the plant.

Preferably, the method includes the following steps. Calculate allowable duration of a preventative maintenance (PM) step. Preferably, following calculation of the allowable duration of a preventative maintenance (PM) step, performing the step of calculation of Maximum Allowable PM Duration (MAD.) Calculate Maximum Allowable PM Duration (MAD) of all steps after the PM step.

Preferably, following the step of calculation of Maximum Allowable PM Duration (MAD), performing the step of determining whether MAD>D, and then (a) if MAD>D, then calculate capacity lose (L), and determine whether L is acceptable; (b) if L is not acceptable, then prompt for a new PM plan, read new WIP distribution (Wn), and branch back to calculate MAD and recycle through the process; (c) if L is acceptable, then END the process, and (d) if MAD≦D, then prompt for a new PM plan and branch back to calculate MAD and recycle through the process.

Preferably, data is supplied to the data processing system defining Duration D, forecasted WIP Distribution (Wn), allowable capacity loss (ALn), process flow, bottleneck step capacity (Cb) and PM step capacity (C0).

It is also preferred that after the data is supplied employing the data processing system for calculation of Allowable Duration (ADn) of a preventative maintenance (PM) step.

In accordance with another aspect of this invention, a production scheduling system is provided for operating a manufacturing plant subsequent to preventative maintenance steps is provided. The system includes a data processing system with memory means for data storage. It includes central processing means for as follows: (a) accessing data from the memory means, (b) receiving data from data input means and (c) supplying data to the memory means. Means are provided for supplying Preventive Maintenance (PM) Duration (D) data to the data processing system, calculating the effect of a PM schedule upon the efficiency of operation of the plant, and providing a new PM schedule to improve the efficiency of operation of the plant.

Preferably, data is supplied to the data processing system defining Duration D, forecasted WIP Distribution (Wn), allowable capacity lose (ALn), process flow, bottleneck step capacity (Cb) and PM step capacity (C0). It is also preferred that means is provided for employing the data supplied in a data processing system for calculation of Allowable Duration (ADn) for preventative maintenance (PM).

Preferably, following calculation of allowable duration of a preventative maintenance (PM) step, the system calculates the Maximum Allowable PM Duration (MAD.)

Preferably, following the step of calculation of Maximum Allowable PM Duration (MAD), the system determines whether MAD>D.

Preferably, the system performs the following tasks.
(a) if MAD>D, then the system calculates capacity loss (L), and determine whether L in acceptable,
(b) if L is not acceptable, then the system prompts for a new PM plan, read new WIP distribution (Wn) and branch back to calculate MAD, and
(c) if L in acceptable, then the system ENDs the process.

Preferably, if MAD≦D, the system prompts a new PM plan and branches back to calculate MAD and recycle through the process.

BRIEF DESCRIPTION OF THE DRAWINGS

The foregoing and other aspects and advantages of this invention are explained and described below with reference to the accompanying drawings, in which.

DESCRIPTION OF THE PREFERRED EMBODIMENT

The system of this invention adds to the process control system of a fabrication plant means for calculating the ADn (Allowable PM duration with an ALn (Allowable Capacity Loss of Step "n" constraint) in each "Step n" of "n" steps. Then the system determines the MAD (Minimum Allowable (PM) Duration) calculated for all steps after the PM Step where MAD=MIN(ADn), for all values of "n" after PM workstation.

Definition of Symbols n=is an integer greater than "1" up to the number of steps in the fabrication unit being managed by the system
Sn=Step "n"; where n>0 includes the steps after the PM Step (S0)
S0=The step of the PM operation
Cn=Capacity of Step "n"
Cb=The Capacity of the Bottleneck
C0=The Capacity of the PM Step
Bn=Beginning time of Capacity Lose (waste) for Step "n".
Rn=Stopping time of Capacity Loss (waste) for Step "n".
L=Total Capacity Loss (waste) caused by the PM Step.
Ln=Capacity Loss (waste) in Step "n" caused by the PM Step.
ALn=Allowable Capacity Loss (waste) of Step "n" where there is an acceptable lose suggested by production experts as indicated in Table I below.
Wn=The WIP (Work In Process) of each Step "n" (Sn), i.e. Step WIP for step "n".
D=Duration of PM Step (S0).
Pn=Process Time of each Step "n".
ADn=Allowable PM duration with ALn constraint for each Step "n".
MAD=Minimum Allowable (PM) Duration calculated for all steps after PM Step.

Basic Concepts Used in the Formula

1. The capacity of a production line is determined by Cb (Capacity of the Bottleneck) which is the one of the steps Sn (Step "n") for which the value of Cn (Capacity of Step "n") is least.
2. Waste in the form of Total Capacity Loss (L) happens only when the step output rate drops below the bottleneck step capacity Cb.
3. Total Capacity Loss (L) caused by the PM Step happens only in those steps after the PM Step.
4. The output rate of a step "n" after the PM Step drops below Cb (Capacity of the Bottleneck) only when the value of Wn (Step WIP for step "n") drops to 0 (zero).
5. The step output rate is limited to C0 (Capacity of the PM Step) or Cb (Capacity of the Bottleneck), whichever is smaller, when Wn (Step WIP for step "n") drops to 0 (zero).

Formula

The capacity lose (waste) beginning time "Bn", capacity loss (waste) restoring time "Rn" and capacity loss (waste) "Ln" (where Ln is the Capacity Loss (waste) in Step "n" caused by the PM Step). For example, calculation of Ln for four representative values (L1, L2, L3 and L4, where n=1, 2, 3 and 4) is performed as follows:

Step 1

Capacity Loss Beginning Time (B1)

$$B1 = \frac{W1}{(Cb - C0)} \quad \text{(Eq. 1)}$$

Capacity Loss Stopping Time (R1)

$$R1 = D \quad \text{(Eq. 2)}$$

Capacity Loss (L1)

$$L1 = (R1 - B1)*(Cb - C0) \quad \text{(Eq. 3)}$$

$$L1 = D(Cb - C0) - W1 \quad \text{(Eq. 4)}$$

Step 2

Capacity Loss Beginning Time (B2)

$$B2 = B1 + \frac{W2}{(Cb - C0)} + P1 \quad \text{(Eq. 5)}$$

Capacity Loss Stopping Time (R2)

$$R2 = R1 + P1 \quad \text{(Eq. 6)}$$

Capacity Loss (L2)

$$L2 = (R2 - B2)*(Cb - C0) \quad \text{(Eq. 7)}$$

$$L2 = L1 - W2 \quad \text{(Eq. 8)}$$

$$L2 = (D)*(Cb - C0) - (W1 + W2) \quad \text{(Eq. 9)}$$

Step 3

Capacity Loss Beginning Time (B3)

$$B3 = B2 + \frac{W3}{(Cb - C0)} + P2 \quad \text{(Eq. 10)}$$

Capacity Loan Stopping Time (R3)

$$R3 = R2 + P2 \quad \text{(Eq. 11)}$$

Capacity Loss (L3)

$$L3 = (R3 - B3)*(Cb - C0) \quad \text{(Eq. 12)}$$

$$L3 = L2 - W3 \quad \text{(Eq. 13)}$$

$$L3 = (D)*(Cb - C0) - (W1 + W2 + W3) \quad \text{(Eq. 14)}$$

Step 4

Capacity Loss Beginning Time (B4)

$$B4 = B3 + \frac{W4}{(Cb - C0)} + P3 \qquad (Eq.\ 15)$$

Capacity Loss Stopping Time (R4)

$$R4 = R3 + P3 \qquad (Eq.\ 16)$$

Capacity Loss (L4)

$$L4 = (R4-B4)*(Cb-C0) \qquad (Eq.\ 17)$$

$$L4 = L3 - W4 \qquad (Eq.\ 18)$$

$$L4 = (D)*(Cb-C0)-(W1+W2+W3+W4) \qquad (Eq.\ 19)$$

Method

Figure 1A:
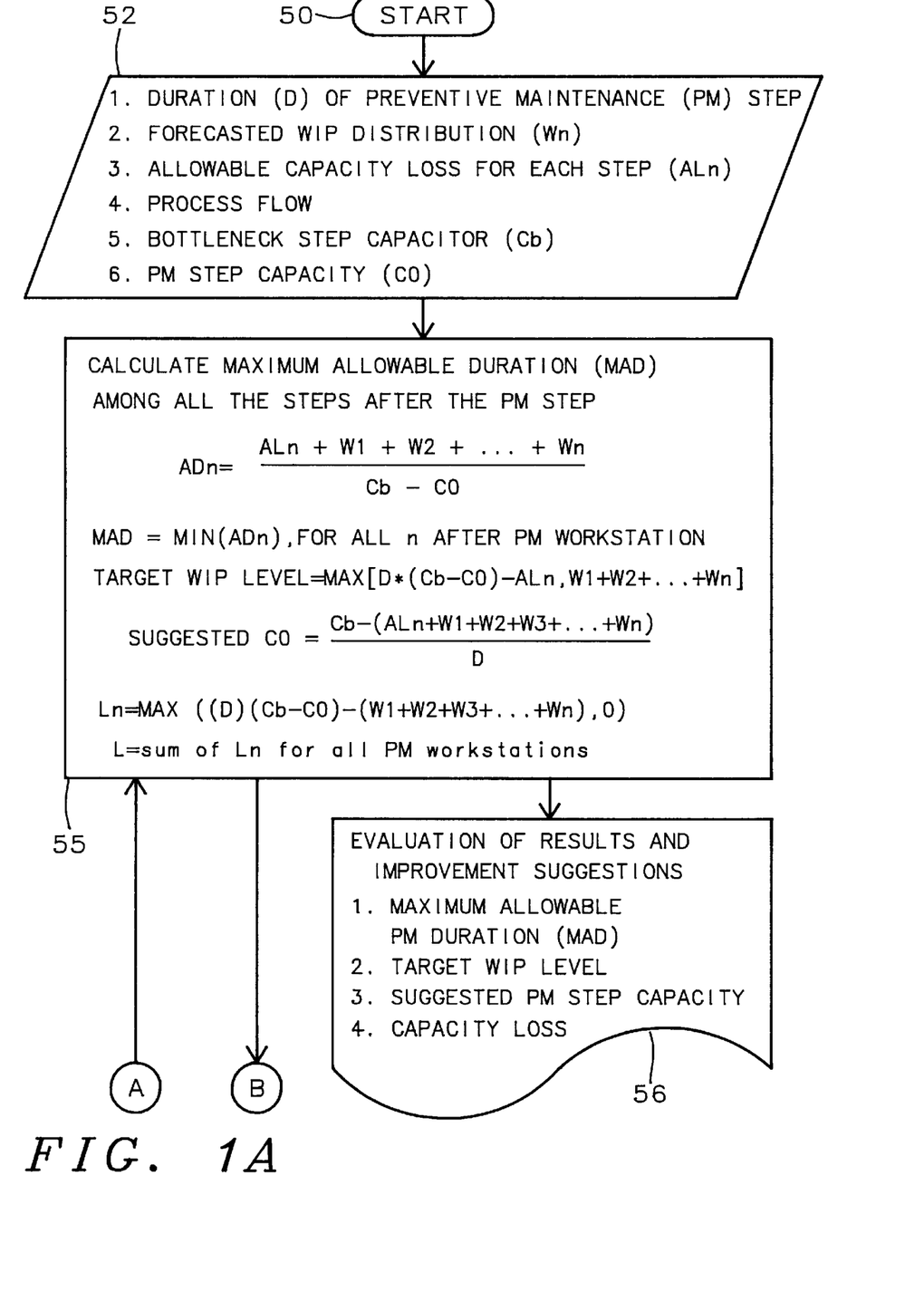
FIGS. 1A and 1B show a flow chart of a method in accordance with this invention.
Figure 1B:
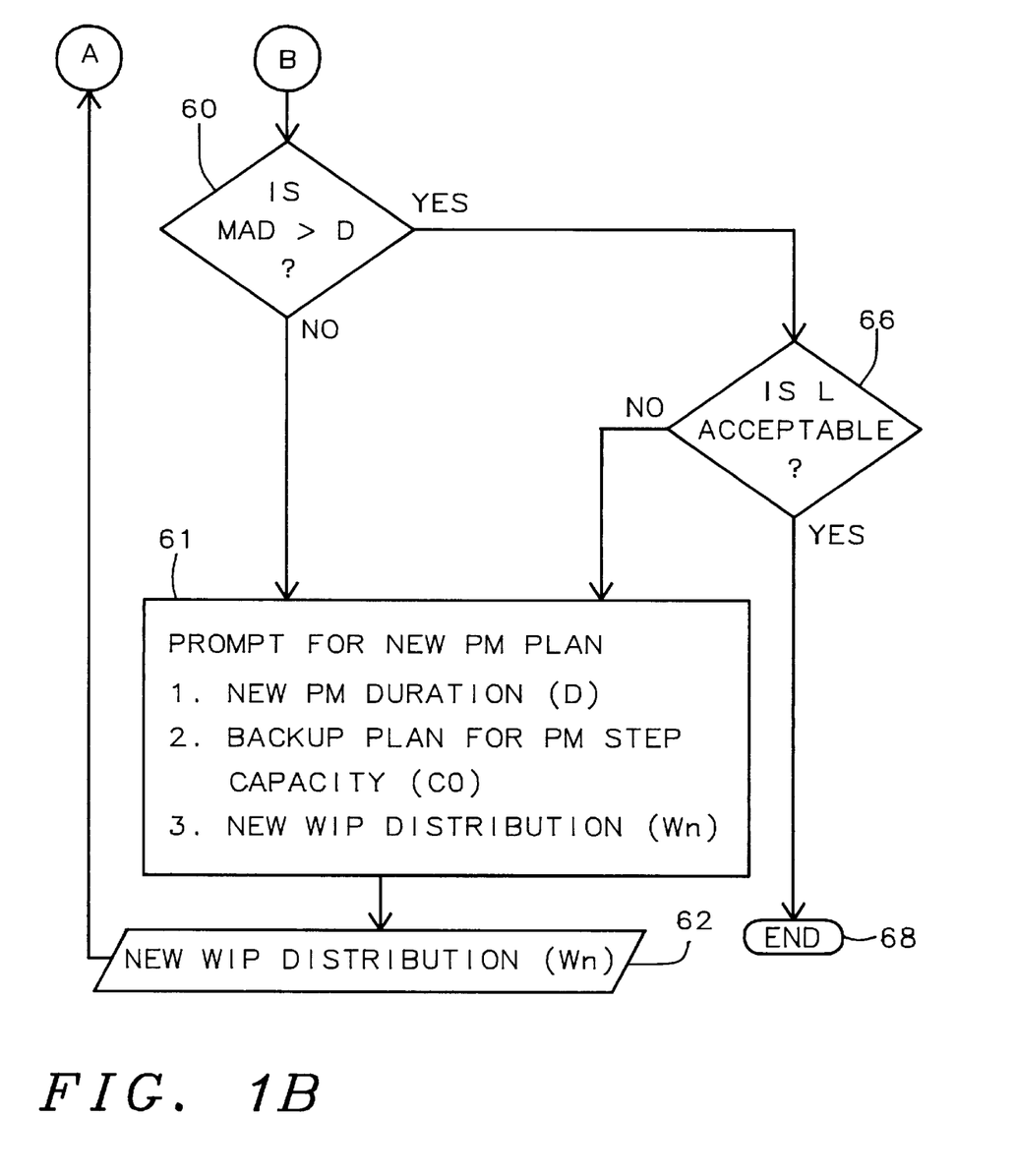

FIGS. 1A and 1B show a flow chart of a method in accordance with this invention.

Referring to FIG. 1A, START block 50 is the first step of the method.

Figure 2:
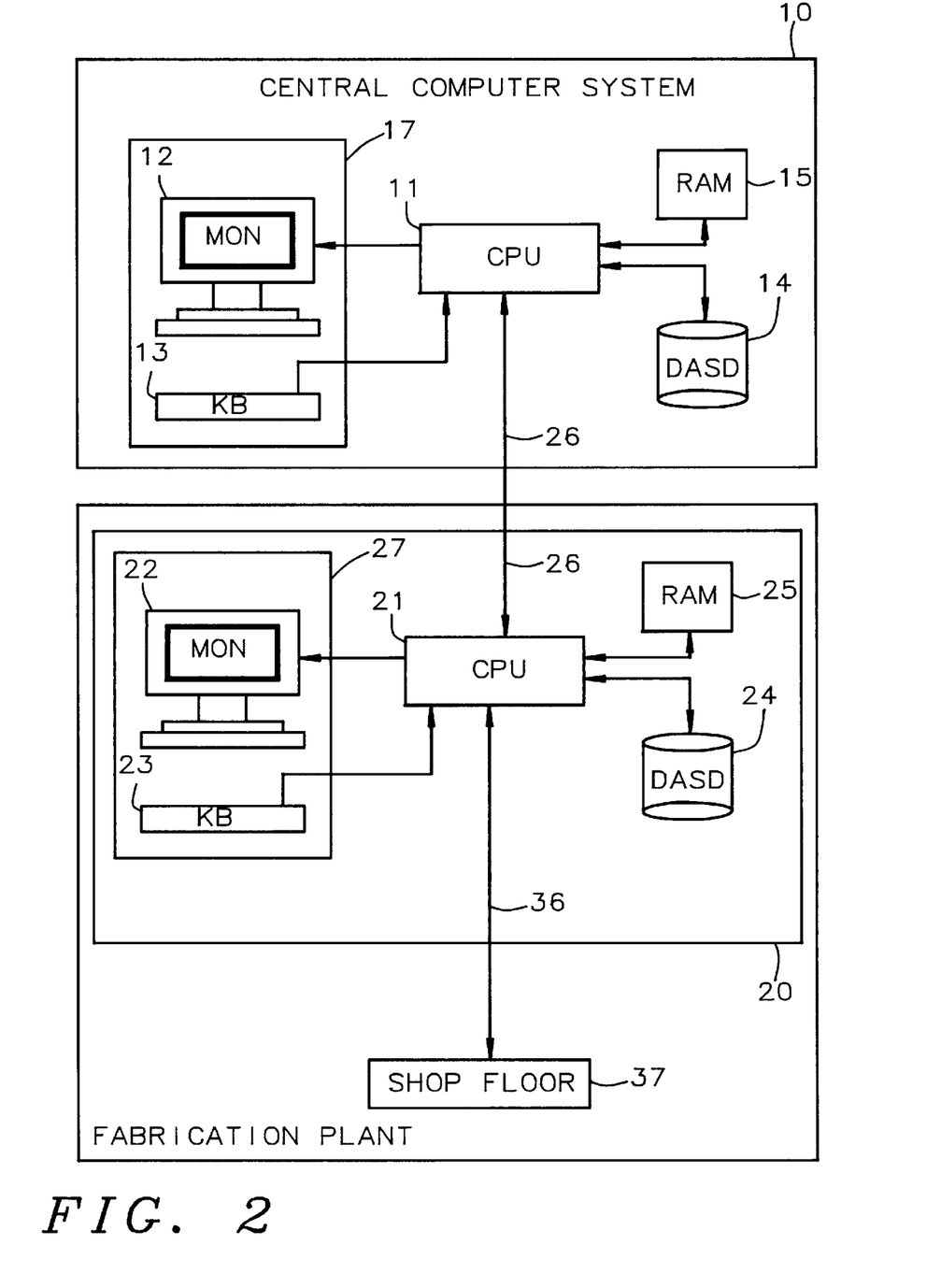
FIG. 2 shows a manufacturing facility incorporating a central computer system connected to control operation of a fabrication plant in accordance with the method of this invention.

In block 52, six steps (1–6) perform a number of clerical operations in which items of data are entered into the CPU 11 in FIG. 2 from data stored in DASD 14 or DASD 24.

Those six steps are as follows:
1. The PM Duration (D) value (days) for the PM step is read from storage DASD 14, DASD 24, and/or keying in the PM Duration (D) data from by a PM engineer at keyboard 13.

The equation 20 (below) is employed to calculate D whenever a PM Engineer plans a PM schedule and wants to know the allowable duration of a PM Step. Equation 20 in used in block 52 and again in block 61.

$$D = \frac{(Ln + W1 + W2 + \ldots + Wn)}{(Cb - C0)} \qquad (Eq.\ 20)$$

where:
Ln=Capacity Loss (waste) in Step "n" Caused by PM Step
Wn=WIP (Work In Process) of each Step "n" (Sn).
Cb=Bottleneck Capacity
C0=PM Step Capacity 2. Forecasted WIP Distribution Data (Wn) for each step "n", W1, W2, W3 . . . Wn is read into the CPU 11. The CPU 11 secures the forecasted WIP distribution data from a WIP distribution forecasting application such as a simulation model.
3. Allowable Capacity Loss (ALn) for each step "n" The CPU 11 receives the values of allowable capacity loss by keying in data by a PM engineer at keyboard 13.
4. Process Flow (The process flow is the sequence of recipes required to produce a wafer.)

The shop floor control system holds the process flow recipe data in the DASD 14 or the DASD 24, which is fetched by conventional processing techniques.
5. Bottleneck Step Capacity (Cb)

The CPU 11 obtains the Cb data from the DASD 14 or the DASD 24, which is fetched by conventional processing techniques.
6. PM Step Capacity (C0)

The CPU 11 obtains the C0 data from the DASD 14 or the DASD 24, which is fetched by conventional processing techniques.

Duration of (D) of PM

In block 55 the "Allowable (PM) Duration (ADn)" is calculated using the data values from block 52, as follows:

$$ADn = \frac{(ALn + W1 + W2 + \ldots + Wn)}{(Cb - C0)} \qquad (Eq.\ 21)$$

Minimum Allowable (PM) Duration

In block 55, the system calculates the Maximum Allowable PM Duration (MAD) among all the steps after the PM Step from all of the data developed in the calculation of the allowable duration for all of the steps of the process (in block 55). MAD is calculated from the value MIN(ADn), for all n after PM workstation as stated equation 18, as follows:

$$MAD = Min(ADn)\ \text{for all } n>0 \qquad (Eq.\ 22)$$

The value of suggested PM step capacity (C0) is calculated in accordance with equation 28 below.

In addition, the value of Ln, i.e. the Capacity Loss (waste) in Step "n" caused by the PM Step is determined in accordance with equation 23 below.

Next in block 56, a documentation processing step occurs resulting after the MAD calculation for PM in block 55 which comprises the Evaluation of Results and Improvement Suggestions.

1) Maximum Allowable PM Duration from block 55.
2) Target WIP level from block 55.
3) Suggest PM Step Capacity from block 55.
4) Capacity Loss Referring to block 60 in FIG. 1B, another function which follows is a decision made by the test as follows:

IS MAD>D?

If the result of the test in step 60 is NO, the system proceed to perform the steps listed in block 61 where the functions are performed as follows:
Prompt for now PM plan or strategy.
1. Now PM duration (D) and/or,
2. Backup plan for PM step (C0), and/or
3. Now WIP Distribution of (Wn) values.

In block 62 the Now WIP Distribution (Wn) clerical operation is performed and the system leads by connector (A) to FIG. 1A to branch back into block 55 to recycle through the above-described process to recalculate MAD among all steps as described above.

If the result of the test in step 60 is YES, the system proceeds to perform the steps listed in block 64 where the functions are performed as follows:

Calculate Capacity Loss (Ln)

$$Ln = Max((D)(Cb-C0)-(W1+W2+ \ldots +Wn),0) \qquad (Eq.\ 23)$$

$$L = \text{Sum of Ln for all n after PM workstation} \qquad (Eq.\ 24)$$

In block 66, the system tests as follows:

"Is L acceptable?"

Table I represents the WIP distribution and capacity loss (waste) of the initial PM plan input into the system 10 in FIG. 1 at a terminal with a monitor 12 and a keyboard 13 by an engineer. The WIP distribution implies a PM beginning time, a machine allocation policy between the time when the engineer inputs data and the PM plan and PM beginning time.

After the first iteration, it is shown that step 4 and step 6 have capacity losses larger than the allowable value. Therefore, the engineer tries another WIP distribution as shown in Table II, i.e. there is a different PM beginning time and machine allocation policy.

TABLE I

| Step | WIP | Cum WIP | ALn | Cb-C0 | ADn | Ln | W dev | C0 |
|---|---|---|---|---|---|---|---|---|
| 1 | 7 | 7 | 0 | 20 | 2 | 13.5 | 17 | 0 | 2.75 |
| 2 | 0.5 | 7.5 | 5 | 25 | 2 | 16.25 | 16.5 | 0 | 2.29167 |
| 3 | 11 | 18.5 | 8 | 7 | 2 | 12.75 | 5.5 | 0 | 2.875 |
| 4 | 0 | 18.5 | 9 | 4 | 2 | 11.25 | 5.5 | 1.5 | 3.125 |
| 5 | 0 | 16.5 | 14 | 6 | 2 | 12.25 | 5.5 | 0 | 2.95833 |
| 6 | 5 | 23.5 | 19 | 0 | 2 | 11.75 | 0.5 | 0.5 | 3.04167 |
| 7 | 0 | 23.5 | 24 | 10 | 2 | 16.75 | 0.5 | 0 | 2.20833 |
| 8 | 0 | 23.5 | 26 | 12 | 2 | 17.75 | 0.5 | 0 | 2.04167 |
| 9 | 1 | 24.5 | 27 | 0 | 2 | 12.25 | 0 | 0 | 2.95833 |
| 10 | 0 | 24.5 | 31 | 15 | 2 | 19.75 | 0 | 0 | 1.70633 |

L = 17 + 16.5 + 5.5 + 5.5 + 5.5 + .5 + .5 + .5 + 0 + 0 = 51.5
= 17 + 16.5   16.5 + 1.5 = 51.5
MAD = Min ADn = 11.25
D = 12
L = 51.5
WIP = Work in Process (# of lots of wafers).
Cum WIP = Cumulative WIP (# of lots of wafers).
ALn = Allowable Capacity Loss of Step "n" (# of lots).
Cb = Capacity of Bottleneck (# of lots).
C0 = PM Step Capacity (# of lots).
ADn = The allowable PM duration with the ALn constraint in step n.
W dev$_n$ = D(Cb − C0) − (ALn + W1 + W2 + ... + Wn) (Eq. 25)

In table II, the WIP level in step 3 increases to 13.5. None of the steps will have a step capacity loss (waste) larger than the allowable step capacity loss (waste). If the total capacity lose (waste), 44 lots, is acceptable, the loop will be terminated; otherwise, another PM plan is tried next.

TABLE II

| Step | WIP | Cum WIP | ALn | Cb-C0 | ADn | Ln | W dev | C0 |
|---|---|---|---|---|---|---|---|---|
| 1 | 7 | 7 | 0 | 20 | 2 | 13.5 | 17 | 0 | 2.75 |
| 2 | 0.5 | 7.5 | 5 | 25 | 2 | 16.25 | 16.5 | 0 | 2.29167 |
| 3 | 13 | 20.5 | 8 | 7 | 2 | 13.75 | 3.5 | 0 | 2.70833 |
| 4 | 0 | 20.5 | 9 | 4 | 2 | 12.25 | 3.5 | 0 | 2.95833 |
| 5 | 0 | 20.5 | 14 | 6 | 2 | 13.25 | 3.5 | 0 | 2.79167 |
| 6 | 5 | 25.5 | 19 | 0 | 2 | 12.75 | 0 | 0 | 2.875 |
| 7 | 0 | 25.5 | 24 | 10 | 2 | 17.75 | 0 | 0 | 2.04167 |
| 8 | 0 | 25.5 | 26 | 12 | 2 | 18.75 | 0 | 0 | 1.875 |
| 9 | 1 | 26.5 | 27 | 0 | 2 | 13.25 | 0 | 0 | 2.79167 |
| 10 | 0 | 26.5 | 31 | 15 | 2 | 20.75 | 0 | 0 | 1.54167 |

L = L1 + L2 + L3 + L4 + L5 + L6 + L7 + L8 + L9 + L10 = 44.0
L = 17 + 16.5 + 3.5 + 3.5 + 3.5 + 0 + 0 + 0 + 0 + 0 = 44.0
= 17 + 16.5 + 10.5 + 0 = 44.0
MAD = MInADn = 12.25
D = 12
L = 44
where
D = PM Duration
L = Sum of Ln for all n after PM workstation
MAD = The maximum allowable PM duration calculated for all the steps after PM step.

Advantages

1. The proposed closed loop system prompts the PM engineer to propose a PM plan until no step capacity loss (waste) step is larger than the allowable value.

2. When fixing the PM Duration, the proposed formula can suggest a target WIP level to prevent the capacity loss (waste) caused by PM. The Production Engineer can suggest a target WIP level as a reference to allocate manufacturing resources before the PM begins to avoid capacity loss (waste).

$$\text{Suggest WIP} = D \, (Cb - C0) \quad \text{(Eq. 26)}$$

$$W \, dev_n = D*(Cb - C0) - (ALn + W1 + W2 + \ldots + Wn) \quad \text{(Eq. 27)}$$

3. When fixing the WIP distribution, the proposed formula can suggest a maximum allowable PM duration as a reference for a PM engineer to met the PM schedule such that a capacity loss (waste) can be avoided. For ADn, see Equation 15 above.

4. When fixing the PM Duration and WIP distribution, the proposed formula can suggest a PM step capacity as a reference for a production engineer to set up a backup plan for the PM step such that a capacity loss (waste) can be avoided.

Calculate PM Step Capacity (# of lots)

$$C0 = \frac{Cb - (ALn + W1 + W2 + \ldots + Wn)}{D} \quad \text{(Eq. 28)}$$

The value of C0 in tables I and II is calculated by this formula, as follows:

1) $C0 = 5 - (20 + 7)/12 = 5 - 27/12 \quad = 5 - 2.22500 \quad = 2.75$

2) $C0 = 5 - (25 + 7.5)/12 = 5 - 32.5/12 \quad = 5 - 2 + 8.5/12$
$= 5 - 2.70833 \quad = 2.29167$ -continued 3) $C0 = 5 - (7 + 18.5)/12 = 5 - 25.5/12 = 5 - 2 + 1.5/12$
$= 5 - 2.12500 = 2.875$ 4) $C0 = 5 - (4 + 18.5)/12 = 5 - 22.5/12 = 5 - 1 + 10.5/12$
$= 5 - 1.87500 = 3.125$ 5) $C0 = 5 - (6 + 18.5)/12 = 5 - 24.5/12 = 5 - 2 + 0.5/12 =$
$= 5 - 2.04167 = 2.95833$ 5. For a given PM schedule, WIP distribution and capacity allocation, the capacity loss (waste) caused by the PM schedule can be evaluated to operation reference such as changing the forecast output target. The value of Ln in Tables I and II Is calculated by the formula as follows:

$$Ln = Max((D)(Cb-C0)-(W1+W2+ \ldots +Wn),0) \quad (Eq.\ 29)$$

For example in Step 1, $$Ln = Max((12)(2)-(7),0) = 17$$

For example in Step 2, $$Ln = (Max((12)(2)-(7.5),0) = 16.5$$

For example in Step 3, $$Ln = (Max((12)(2)-(18.5),0) = 5.5$$

L=Sum of Ln for all n after the PM step is performed, i.e. as follows:

$$L = \text{Sum of Ln for n>0} \quad (Eq.\ 30)$$

To overcome the problem of ADn being 11.25 in Table I, step 4 where W dev =1.5, the strategy of the production engineer is to change WIP by one of several alternative methods.

Alternative I

The Production Engineer looks at the value of CumWIP in step 4 and increase VIP in step 3+2.0 (i.e. more than 1.5). See Table II which shown the now strategy that is produced and we seen that the calculated value ADn in now 12.25 and that in an allowable value. Also, by adding 2.0 to step 3 WIP the problem in step 6 in overcome as well as the problem in step 4 as can be seen by reference to step 6 in Table II.

Alternative II

The duration is changed in the above example simply to change MAD=MinADn=11.25 to 12.00 for PM will result in no capacity loss (waste)

Alternative III

Adjust C0 to overcome the PM problem.

| | | | | | | For Table I: | | | | | | | | | | | | | |
|---|---|---|---|---|---|---|---|---|---|---|---|---|---|---|---|---|---|---|---|
| L = | L1 + | L2 | + | L3 | + | L4 | + | L5 | + | L6 | + | L7 | + | L8 | + | L9 | + | L10 | = 51.5 |
| L = | 17 + | 16.5 | + | 5.5 | + | 5.5 | + | 5.5 | + | 0.5 | + | 0.5 | + | 0.5 | + | 0 | + | 0 | = 51.5 |
| = | 17 + | 16.5 | + | | | 16.5 | + | | | | | 1.5 | | | | | | | = 51.5 |
| | | | | | | For Table II: | | | | | | | | | | | | | |
| L = | L1 + | L2 | + | L3 | + | L4 | + | L5 | + | L6 | + | L7 | + | L8 | + | L9 | + | L10 | = 44.0 |
| L = | 17 + | 16.5 | + | 3.5 | + | 3.5 | + | 3.5 | + | 0 | + | 0 | + | 0 | + | 0 | + | 0 | = 44.0 |
| = | 17 + | 16.5 | + | | | 10.5 | | | | | | | | | | | | | = 44.0 |

The purpose of this invention is to overcome the unallowable capacity level which in below the minimum. Referring to Table I, in the Column ADn, there is a problem when AD falls below D (the minimum allowable value of ADn) which has a value of 12 in accordance with the Example in steps 4 and 6 of Table I.

Applicants have discovered that the above problem can be overcome by employing a system for adjustment of the WIP to an optimum level in steps prior to those which fail to meet the minimum allowable value D. For example, the system calculates the value of W $dev_n$ from Equation (25) above to be equal to 1.5.

The planning time commences a certain time before the PM begins. For example, the calculation may commence 5 hours before PM begins to determine the plan for 12 hours subsequent to the 5 hours.

Computer Control System

FIG. 2 shows a manufacturing facility incorporating a central computer system 10 connected to control operation of a fabrication plant 40 in accordance with the method of this invention.

The central computer system 10 includes a (Central Processing Unit) central CPU 11 connected to DASD (Direct Access Storage Device) 14 (e.g. a disk drive) and to Random Access Memory (RAM) 15. In addition, the central CPU 11 is connected to monitor (MON) 12 and to a keyboard (KB) 13, which monitor 12 and keyboard 13 serve as a terminal 17 by the CPU operator to enter data on the keyboard and to provide other conventional interactive functions. The monitor 12 includes a display screen for display of data from the central CPU 11 to the operator for use in making selections of alternative features during operation of the system of FIG. 2.

The central CPU 11 is connected by line 26 to a plant CPU 21 in the fabrication plant 40. Plant 40 includes a shop floor computer control system 20 and a shop floor 37 composed of manufacturing tools which perform many manufacturing steps in a process under the control of the shop floor computer control system 20.

In turn, the plant CPU 21 is connected to DASD (Direct Access Storage Device) 24 (e.g. a disk drive) and to Random Access Memory (RAM) 25. In addition, the plant CPU 21 in connected to monitor (MON) 22 and to a keyboard (KB) 23 which serve as a terminal 27 used by the operator to enter data on the keyboard and to provide other conventional interactive functions. The monitor MON includes a display screen for display of data from the CPU 21 to the plant operator for use in making selections of alternative features during operation of the system of FIG. 2.

The CPU 21 is connected by line 36 to shop floor 37 for collection of data from the shop floor 37 and for sending instructions to the shop floor 37.

In the DASD 14 are stored the programs which perform the capacity loss control method for preventative maintenance (PM) in an IC plant which are accessed during the planning cycle for performing a PM step during the operation of the fabrication plant 40. The CPU 21 collects data from the shop floor which is used to determine the operating conditions of the tools on the shop floor and to provide the parameters an to operation of the shop floor for use by the CPU 11 during performance of the program.

While this invention has been described in terms of the above specific embodiment(s), those skilled in the art will recognize that the invention can be practiced with modifications within the spirit and scope of the appended claims, i.e. that changes can be made in form and detail, without departing from the spirit and scope of the invention. Accordingly all such changes come within the purview of the present invention and the invention encompasses the subject matter of the claims which follow.

Having thus described the invention, what is claimed as new and desirable to be secured by Letters Patent is as follows:

1. A method of operating a manufacturing plant subsequent to preventative maintenance steps, comprising the following steps:
   providing a data processing system having memory means for data storage,
   providing central processing means for (a) accessing data from said memory means, (b) receiving data from data input means and (c) supplying data to said memory means,
   providing Preventive Maintenance (PM) Duration (D) data to said data processing system,
   calculating the effect of a PM schedule upon the efficiency of operation of the plant, and
   providing a new PM schedule to improve said efficiency of operation of said plant.

2. A method in accordance with claim 1 wherein data is supplied to said data processing system defining Duration D, forecasted WIP Distribution (Wn), allowable capacity lose (ALn), process flow, bottleneck step capacity (Cb) and PM step capacity (C0).

3. A method in accordance with claim 2 wherein after said data is supplied employing said data processing system for calculation of Allowable Duration (ADn) of a preventative maintenance (PM) step.

4. A method in accordance with claim 3 wherein, following calculation of allowable duration of a preventative maintenance (PM) step, performing the step of calculation of Maximum Allowable PM Duration (MAD.).

5. A method in accordance with claim 4 wherein, following the step of calculation of Maximum Allowable PM Duration (MAD), performing the step of determining whether MAD>D.

6. A method in accordance with claim 5 wherein, the steps are provided as follows:
   (a) if MAD>D, then calculate capacity lose (L), and determine whether L is acceptable,
   (b) if L is not acceptable, then prompt for a new PM plan, read new WIP distribution (Wn) and branch back to calculate MAD, and
   (c) if L is acceptable, then END said process.

7. A method in accordance with claim 5 wherein, if MAD$\leq$D, then prompt for a new PM plan and branch back to calculate MAD and recycle through the process.

8. A method of operating a manufacturing plant subsequent to preventative maintenance steps, comprising the following steps:
   providing a data processing system having memory means for data storage,
   providing central processing means for
   (a) accessing data from said memory means,
   (b) receiving data from data input means and
   (c) supplying data to said memory means,
   providing Preventive Maintenance (PM) Duration (D) data to said data processing system,
   calculating allowable duration of a preventative maintenance (PM) step,
   calculating Maximum Allowable PM Duration (MAD) of all steps after said PM step,
   determining whether MAD>D, and then
   (a) if MAD>D, then calculate capacity loss (L), and determine whether L is acceptable,
   (b) if L is not acceptable, then prompt for a new PM plan, read new WIP distribution (Wn), and branch back to calculate MAD and recycle through the process,
   (c) if L is acceptable, then END said process,
   (d) if MAD$\leq$D, then prompt for a new PM plan and branch back to calculate MAD and recycle through the process.

9. A production scheduling system for operating a manufacturing plant subsequent to preventative maintenance steps, comprising:
   a data processing system having memory means for data storage, central processing means comprising:
   (a) means for accessing data from said memory means,
   (b) means for receiving data from data input means and
   (c) means for supplying data to said memory means,
   means for providing Preventive Maintenance (PM) Duration (D) data to said data processing system,
   means for calculating the effect of a PM schedule upon the efficiency of operation of the plant, and
   means for providing a new PM schedule to improve said efficiency of operation of said plant.

10. Apparatus in accordance with claim 9 wherein data is supplied to said data processing system defining Duration D, forecasted WIP Distribution (Wn), allowable capacity loss (ALn), process flow, bottleneck capacity (Cb) and PM step capacity (C0).

11. Apparatus in accordance with claim 10 wherein said data processing system calculates Allowable Duration (ADn) of a preventative maintenance (PM) after said data is supplied.

12. Apparatus in accordance with claim 11 wherein following calculation of allowable duration of a preventative maintenance (PM) step, said system calculates the Maximum Allowable PM Duration (MAD).

13. Apparatus in accordance with claim 12 wherein following the step of calculation of Maximum Allowable PM Duration (MAD) said system performs the step of determining whether MAD>D.

14. Apparatus in accordance with claim 13 wherein, said system performs the steps as follows:
   (a) if MAD>D, the system calculates capacity lose (L), and determines whether L is acceptable,
   (b) if L is not acceptable, the system prompts for a new PM plan, reads new WIP distribution (Wn) and branches back to calculate MAD, and
   (c) if L is acceptable, then the system ENDs said process.

15. Apparatus in accordance with claim 14 wherein, if MAD$\leq$D, then said system prompts for a new PM plan and branches back to calculate MAD and recycles through the preceding steps.

16. A production scheduling system for operating a manufacturing plant subsequent to preventative maintenance steps, comprising the following steps:

a data processing system having memory means for data storage, central processing means for (a) accessing data from said memory means, (b) receiving data from data input means and (c) supplying data to said memory means, means for providing a Preventive Maintenance (PM) Duration (D) data to said data processing system, calculating allowable duration of a preventative maintenance (PM) step, means for calculating Maximum Allowable PM Duration (MAD) of all steps after said PM step, means for determining whether MAD>D, and then
   (a) if MAD>D, then calculate capacity loss (L), and determine whether L is acceptable,
   (b) if L is not acceptable, then prompt for a new PM plan, read new WIP distribution (Wn), and branch back to calculate MAD and recycle through the process,
   (c) if L is acceptable, then END said process,
   (d) if MAD$\leq$D, then prompt for a new PM plan and branch back to calculate MAD and recycle through the process.

* * * * *